United States Patent
Rothenbury (10) Patent No.: US 7,404,909 B2
(45) Date of Patent: Jul. 29, 2008

(54) MIRROR INCLUDING DIELECTRIC PORTIONS AND A METHOD OF MANUFACTURING THE SAME

(75) Inventor: David A. Rothenbury, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/567,309

(22) Filed: Dec. 6, 2006

(65) Prior Publication Data

US 2008/0137170 A1 Jun. 12, 2008

(51) Int. Cl.
*B44C 1/22* (2006.01)

(52) U.S. Cl. .................. 216/31; 216/26; 359/214; 359/223

(58) Field of Classification Search .................. 216/26, 216/27, 31; 359/223, 224, 2, 214
See application file for complete search history.

(56) References Cited

U.S. PATENT DOCUMENTS

| | | | |
|---|---|---|---|
| 5,212,582 A | * 5/1993 | Nelson | 359/224 |
| 5,278,012 A | * 1/1994 | Yamanaka et al. | 430/30 |
| 6,760,145 B1 | * 7/2004 | Taylor et al. | 359/290 |
| 2005/0218476 A1 | * 10/2005 | Lee et al. | 257/529 |

* cited by examiner

*Primary Examiner*—Lan Vinh
(74) *Attorney, Agent, or Firm*—W. James Brady, III; Frederick J. Telecky, Jr.

(57) ABSTRACT

The invention provides a method for manufacturing a microelectronic device and a microelectronic device. The method for manufacturing the microelectronic device, without limitation, may include forming a first mirror layer over and within one or more openings in a sacrificial spacer layer, and forming a dielectric layer over an upper surface of the first mirror layer and within the one or more openings. The method may further include subjecting the dielectric layer to an etch, the etch removing the dielectric layer from the upper surface and leaving dielectric portions along sidewalls of the one or more openings, and forming a second mirror layer over the first mirror layer and within the one or more openings, the dielectric portions separating the first mirror layer and the second mirror layer along the sidewalls.

19 Claims, 6 Drawing Sheets

MIRROR INCLUDING DIELECTRIC PORTIONS AND A METHOD OF MANUFACTURING THE SAME

TECHNICAL FIELD OF THE INVENTION

The invention is directed, in general, to a microelectronic device and, more specifically, to one that has a mirror including dielectric portions and a method of manufacturing the same.

BACKGROUND OF THE INVENTION

A Digital Micromirror Device (DMD) is a type of micro electro-mechanical systems (MEMS) device. Invented in 1987 at Texas Instruments Incorporated, the DMD is a fast, reflective digital light switch. It can be combined with image processing, memory, a light source, and optics to form a digital light Processing® system capable of projecting large, bright, high-contrast color images.

The DMD is fabricated using CMOS-like processes over a CMOS memory. It has an array of individually addressable mirror elements, each having a mirror that can reflect light in one of a plurality of directions depending on the state of an underlying memory cell. By combining the DMD with a suitable light source and projection optics, the mirror reflects incident light either into or out of the pupil of the projection lens. Thus, the first state of the mirror appears bright and the second state of the mirror appears dark. Gray scale is achieved by binary pulse width modulation of the incident light. Color is achieved by using color filters, either stationary or rotating, in combination with one, two, or three DMD chips.

DMD's may have a variety of designs, with the most popular design being a structure consisting of a mirror that is rigidly connected to an underlying yoke. The yoke is connected by two thin mechanically compliant torsion hinges to support posts that are attached to the underlying substrate. Electrostatic fields that develop between the underlying memory cell and the mirror cause rotation in the positive or negative rotation direction.

The fabrication of the above-described DMD superstructure begins with a completed CMOS memory circuit. Through the use of photoresist layers, the superstructure is formed with alternating layers of aluminum for the address electrode, hinge, yoke, and mirror layers and hardened photoresist for sacrificial layers that form air gaps.

While the DMD superstructures are presently quite popular, they do experience certain problems. For example, one problem that today's DMD superstructures experience is the device failure of the mirror layers. This is particularly problematic because the failure of each mirror layer causes a pixel in an image being displayed by the DMD superstructure to be incorrect. It is believed that the failure of the mirror layers is at least partially a function of metal fatigue that the mirror layers experience, for example at the rotation point thereof.

Accordingly, what is needed in the art is a method for manufacturing a microelectronic device, such as a DMD, that does not experience the drawbacks of the prior art methods.

SUMMARY OF THE INVENTION

To address the above-discussed deficiencies of the prior art, the invention provides a method for manufacturing a microelectronic device and a microelectronic device. The method for manufacturing the microelectronic device, without limitation, may include forming a first mirror layer over and within one or more openings in a sacrificial spacer layer, and forming a dielectric layer over an upper surface of the first mirror layer and within the one or more openings. The method may further include subjecting the dielectric layer to an etch, wherein the etch removes the dielectric layer from the upper surface and leaves dielectric portions along sidewalls of the one or more openings. The method may additionally include forming a second mirror layer over the first mirror layer and within the one or more openings, the dielectric portions separating the first mirror layer and the second mirror layer along the sidewalls.

In another embodiment, the method for manufacturing the microelectronic device includes 1) forming a first photoresist spacer layer over a substrate, the first photoresist spacer layer having one or more openings therein, 2) forming a hinge structure over the first photoresist spacer layer and within the one or more openings, 3) forming a second photoresist spacer layer over the hinge structure, the second photoresist spacer layer having one or more openings therein, 4) forming a first mirror layer over the second photoresist spacer layer and within the one or more openings in the second photoresist spacer layer, 5) forming a dielectric layer over an upper surface of the first mirror layer and within the one or more openings in the second photoresist spacer layer, 6) subjecting the dielectric layer to an etch, the etch removing the dielectric layer from the upper surface of the first mirror layer and leaving dielectric portions along sidewalls of the one or more openings in the second photoresist spacer layer, 7) forming a second mirror layer over the first mirror layer and within the one or more openings in the second photoresist spacer layer, the dielectric portions separating the first mirror layer and the second mirror layer along the sidewalls, and 8) removing the first and second photoresist spacer layers after forming the second mirror layer.

As briefly mentioned, the invention also discloses a microelectronic device. The microelectronic device, among other features, may include a conductive feature, a hinge structure located over and contacting the conductive feature, wherein at least a portion of the hinge structure defines a first well, and a mirror structure located over the hinge structure. The mirror structure, in this embodiment, may further include a first mirror layer contacting the hinge structure, wherein at least a portion of the first mirror layer defines a second well, dielectric portions located along sidewalls of the second well, and a second mirror layer located over the first mirror layer and within the second well, the dielectric portions located between the first mirror layer and the second mirror layer along the sidewalls.

BRIEF DESCRIPTION OF THE DRAWINGS

For a more complete understanding of the invention, reference is now made to the following descriptions taken in conjunction with the accompanying drawings, in which.

DETAILED DESCRIPTION

Figure 1:
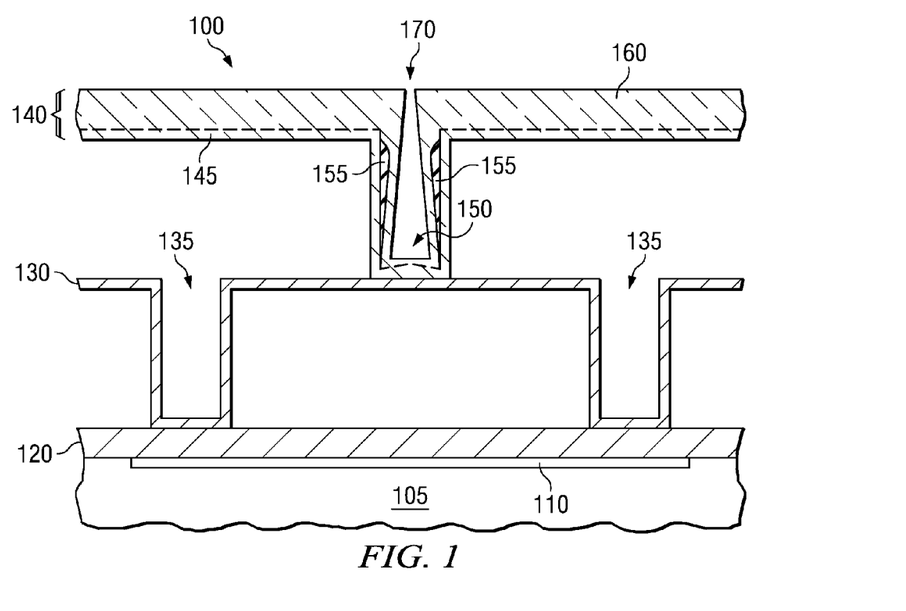
FIG. 1 illustrates a microelectronic device constructed according to the invention.

The microelectronic device 100 of FIG. 1, such as a DMD, includes a substrate 105 having control circuitry 110 located therein or thereover. Positioned over the control circuitry 110 in this embodiment is a conductive feature 120. Additionally, positioned over the conductive feature 120 and in contact with the conductive feature 120, is a hinge structure 130. The hinge structure 130, as illustrated, may define one or more first wells 135.

The microelectronic device 100 of FIG. 1 further includes a mirror structure 140 positioned over the hinge structure 130. In accordance with the invention, the mirror structure 140 includes a first mirror layer 145. As illustrated, the first mirror layer 145 may be in contact with the hinge structure 130 and may define one or more second wells 150. Positioned along sidewalls of the wells 150 may be dielectric portions 155. The term "along," as used in the context of a location of the dielectric portions 155, means that the dielectric portions 155 may be along an entire length of the sidewalls or only a portion of the length of the sidewalls.

The mirror structure 140 may additionally include a second mirror layer 160 located over the first mirror layer 145 and within the one or more second wells 150. As is illustrated in FIG. 1, the dielectric portions 155 remain between the first mirror layer 145 and the second mirror layer 160 along the sidewalls.

When used in this fashion, the dielectric portions 155 lend structure and strength to the mirror layer 140. Accordingly, the mirror layer 140 does not experience the problems, such as metal fatigue, that might be experienced in traditional structures. Moreover, the inclusion of the dielectric portions 155 reduces the opening 170, which leads to improved contrast ratios in the microelectronic device 100.

FIGS. 2-8 illustrate views of detailed manufacturing steps instructing how one might, in one embodiment, manufacture a microelectronic device 200 in accordance with the invention. The microelectronic device 200 of FIG. 2 includes control circuitry 210 formed on or in a substrate 205. The substrate 205 may comprise a number of different materials while staying within the invention. In the embodiment illustrated in FIG. 2, however, the substrate 205 is epitaxial silicon.

Figure 2:
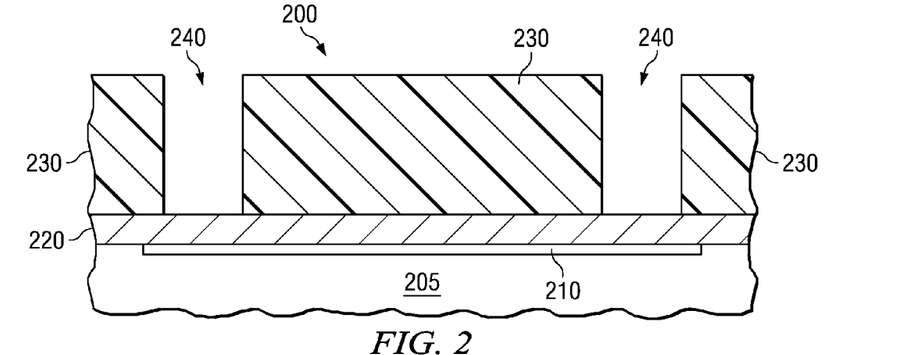
FIGS. 2-8 illustrate views of detailed manufacturing steps instructing how one might, in one embodiment, manufacture a microelectronic device in accordance with the invention.

The control circuitry 210, which may be conventional, may comprise a plurality of CMOS devices, and in one embodiment, addressable SRAM circuits within the substrate 205. Nevertheless, other embodiments may exist wherein additional or different circuitry may be included within the control circuitry 210. While not shown, the microelectronic device 200 may further include an insulating layer formed over the control circuitry 210. The insulating layer may comprise an oxide, such as silicon oxide that has been planarized by chemical mechanical planarization.

Located over the substrate 205 and control circuitry 210 is a conductive feature 220. The conductive feature 220 may comprise aluminum or aluminum alloy that has been sputter deposited to a thickness ranging from about 100 nm to about 400 nm. While not shown in FIG. 2, vias would typically be formed in the insulating layer to allow the conductive feature 220 to contact the underlying control circuitry 210, where necessary. The conductive feature 220 may also be patterned, resulting in electrode pads and a bias bus. The conductive feature 220 may be patterned by plasma-etching using plasma-deposited silicon dioxide as the etch mask.

Positioned over the conductive feature 220 is a first spacer layer 230 (e.g., sacrificial spacer layer that is removed later in the manufacturing process). As illustrated, the first spacer layer 230 typically has one or more openings 240 located therein. For example, in one embodiment the first spacer layer 230 is formed by spin depositing a photoresist (e.g., a material that would be materially affected by temperatures greater than about 150° C.) to a thickness ranging from about 400 nm to about 1500 nm. Thereafter, the one or more openings 240 may be formed within the first spacer layer 230.

Conventional patterning and etching techniques may be used to form the openings 240 in the first spacer layer 230. For example, the openings 240 may be patterned into the first spacer layer 230 by exposing, patterning, developing, and then descuming the first spacer layer 230. After patterning the openings 240, the first spacer layer 230 may be deep UV hardened to a temperature of about 200° C. to prevent flow and bubbling during subsequent processing steps.

Figure 3:
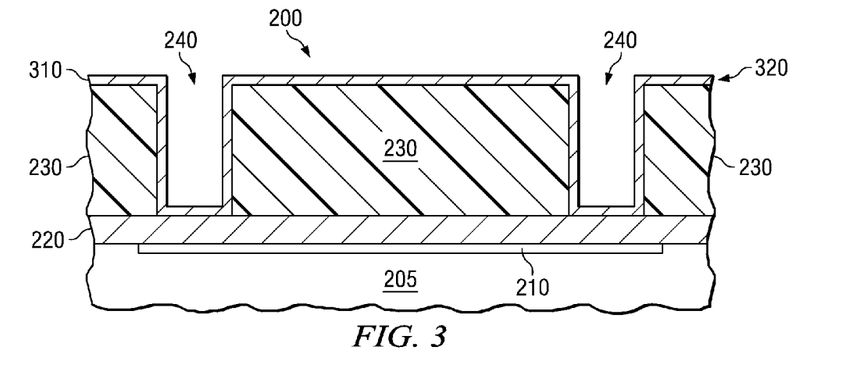

FIG. 3 illustrates the microelectronic device 200 of FIG. 2 after forming a hinge layer 310 over the first spacer layer 230 and within the openings 240. The hinge layer 310, in one embodiment, is a first metal layer comprising aluminum or an alloy thereof. Nevertheless, the hinge layer 310 may comprise other materials, including stacked layers. In the embodiment shown, the hinge layer 310 forms at least a portion of a hinge feature (also referred to as a binge feature) as might be used in a DMD structure.

The hinge layer 310 illustrated in FIG. 3 may be formed using various different processes. In one embodiment, however, the hinge layer 310 is sputter deposited using a physical vapor deposition (PVD) process. For example, the hinge layer 310 may be sputter deposited to a thickness ranging from about 30 nm to about 100 nm. Other thicknesses and/or formation techniques could be used to form the hinge layer 310.

After forming the hinge layer 310, the hinge layer 310 may then be patterned into a hinge structure 320. The process for patterning the hinge layer 310 may vary. For example, in one embodiment the hinge layer 310 is patterned using a chlorine based plasma. Nevertheless, other known etch chemistries or plasmas are within the scope of the invention. After finishing patterning the hinge structure 320, the microelectronic device 200 of FIG. 3 may be subjected to a clean step. For example, the microelectronic device 200 may be subjected to a 60 second develop clean to remove unwanted polymer.

Figure 4:
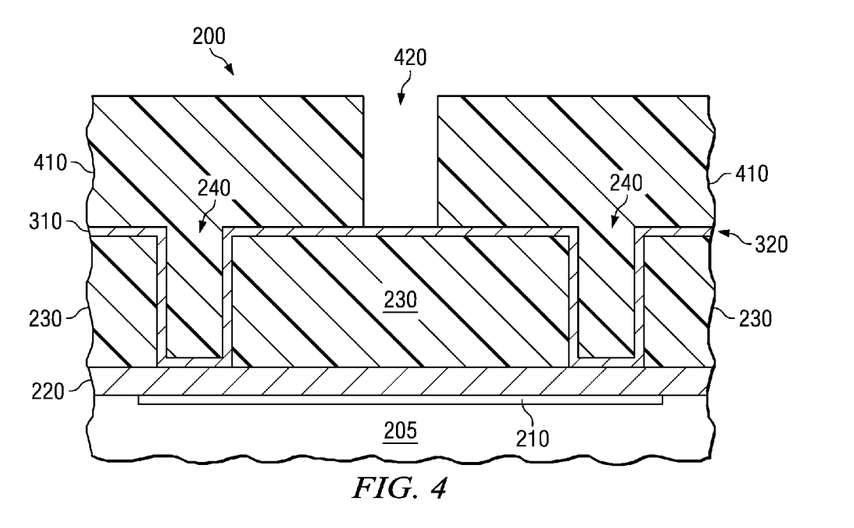

FIG. 4 illustrates the microelectronic device 200 of FIG. 3 after forming a second spacer layer 410 over the hinge structure 320. The second spacer layer 410 may be formed by spin depositing photoresist to a thickness ranging from about 500 nm to about 1500 nm. Thereafter, one or more openings 420 may be formed within the second spacer layer 410. Conventional patterning and etching techniques may be used to form the openings 420 in the second spacer layer 410, including a process substantially similar to that used to form the openings 240. The patterned second spacer layer 410 may then be deep UV hardened to a temperature of around about 175° C. to prevent flow and bubbling during subsequent processing steps.

Figure 5:
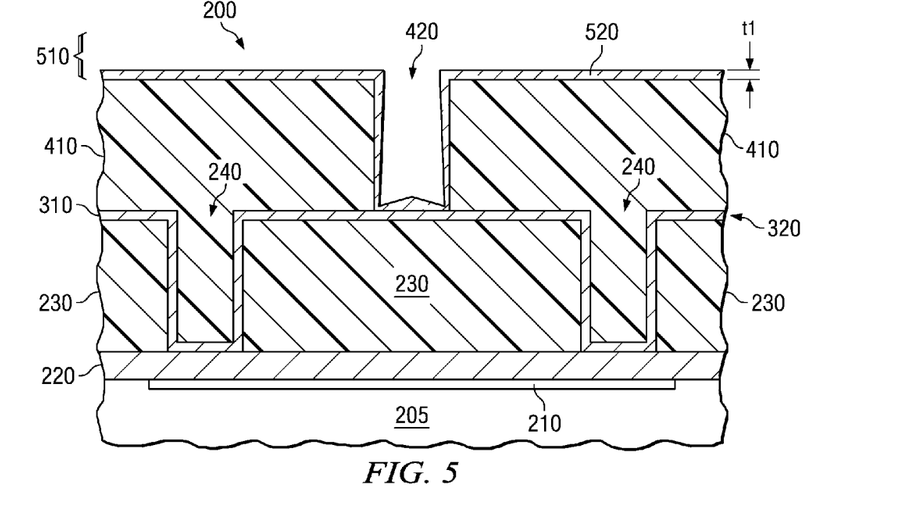

FIG. 5 illustrates the microelectronic device 200 of FIG. 4 after starting to form a mirror layer 510. As is illustrated, the mirror layer 510 is formed over the second spacer layer 410 and within the openings 420 therein. As is further illustrated, the mirror layer 510 is in contact with the hinge structure 320.

As shown in FIG. 5, the mirror layer 510 initially includes a first mirror layer 520. The first mirror layer 520, in one embodiment, is a metal layer comprising aluminum or an alloy thereof. Nevertheless, the first mirror layer 520 may comprise other conductive and reflective materials.

The first mirror layer 520 illustrated in FIG. 5 may be formed using various different processes. In one embodiment, however, the first mirror layer 520 is sputter deposited (e.g., using a PVD process). For example, the first mirror layer 520 may be sputter deposited using a long throw distance target (e.g., as compared to the shorter throw distance target used to form the second mirror layer 810). Accordingly, in one embodiment the long throw distance is set to about 125 mm or more, and thus provides a maximum thickness ($t_1$) for the first mirror layer 520 ranging from about 60 nm to about 90 nm, among others. In certain embodiments, the first mirror layer 520 should be formed using a formation temperature less than about 150° C. At this temperature the formation of the first mirror layer 520 does not substantially affect the integrity of the first or second spacer layers 230, 410.

Figure 6:
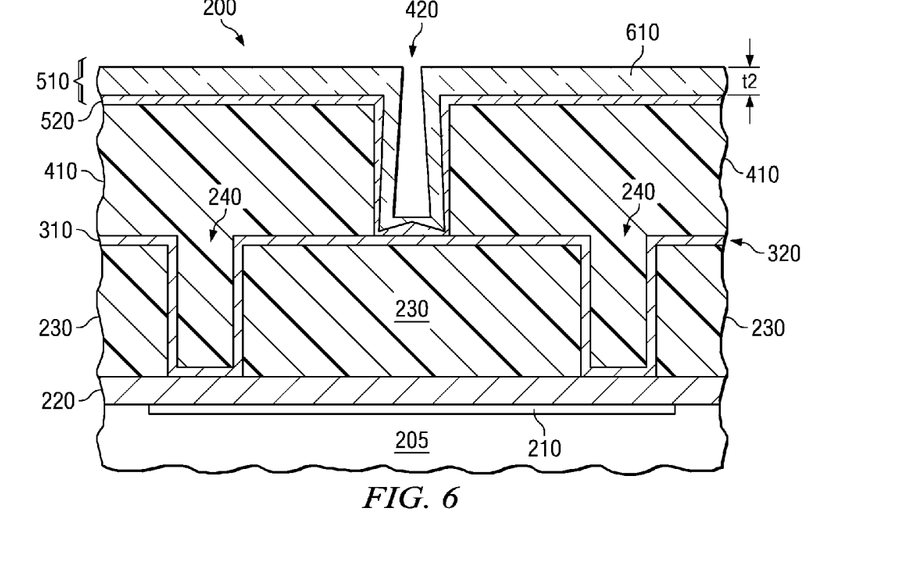

FIG. 6 illustrates the microelectronic device 200 of FIG. 5 after forming a dielectric layer 610 over an upper surface of the first mirror layer 520 and within the one or more openings 420 in the second spacer layer 410. The dielectric layer 610, in the embodiment of FIG. 6, comprises an oxide (e.g., silicon dioxide). For example, the dielectric layer 610 might comprise an oxide chemical vapor deposition (CVD) deposited to a thickness ($t_2$) ranging from about 200 nm to about 300 nm. Nevertheless, other embodiments may exist wherein the dielectric layer 610 comprises a dielectric material or thickness ($t_2$) different than that illustrated. In those embodiments, conventional processes might be used to manufacture such a layer.

Figure 7:
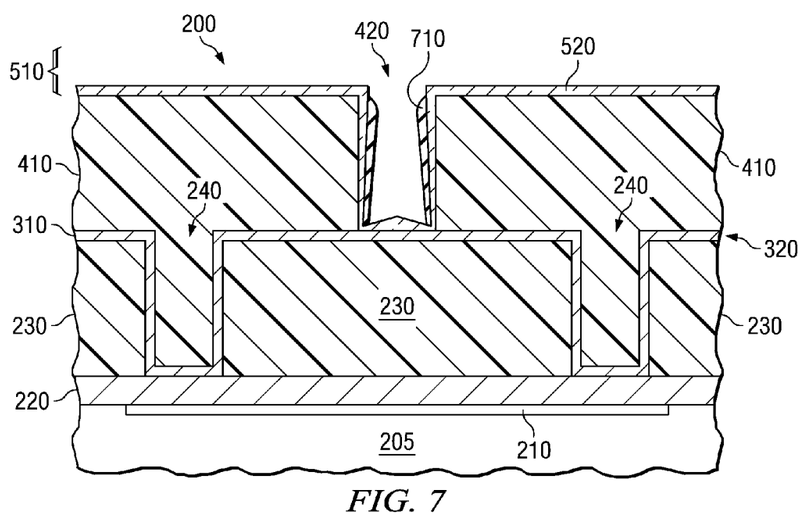

FIG. 7 illustrates the microelectronic device 200 of FIG. 6 after subjecting the dielectric layer 610 to an etch. For example, the dielectric layer 610 might be subjected to an etch configured to remove the dielectric layer 610 from an upper surface of the first mirror layer 520 while leaving dielectric portions 710 along sidewalls of the one or more openings 420 in the second spacer layer 410. The upper surface, in this embodiment, would be the horizontal surface (s) of the first mirror layer 520 that the etch encounters. The upper surface might also include the horizontal surface of the first mirror layer 520 located within the opening 420.

In one embodiment, the dielectric layer 610 is removed from the upper surface of the first mirror layer 520, including the horizontal portion located within the opening 420. This may be important in subsequent processing steps, particularly the processing step wherein the second mirror layer 810 is formed. For instance, certain embodiments need the second mirror layer 810 to be formed directly on the upper surface of the first mirror layer 520, without any remnants of the dielectric layer 610 located there between.

Those skilled in the art understand the types of etches that might be used to form the dielectric portions 710. For instance, in one embodiment an anisotropic etch using a specific etch chemistry is used to form the dielectric portions 710. Nevertheless, depending on the material that the dielectric layer 610 comprises, the etch chemistry will vary.

Figure 8:
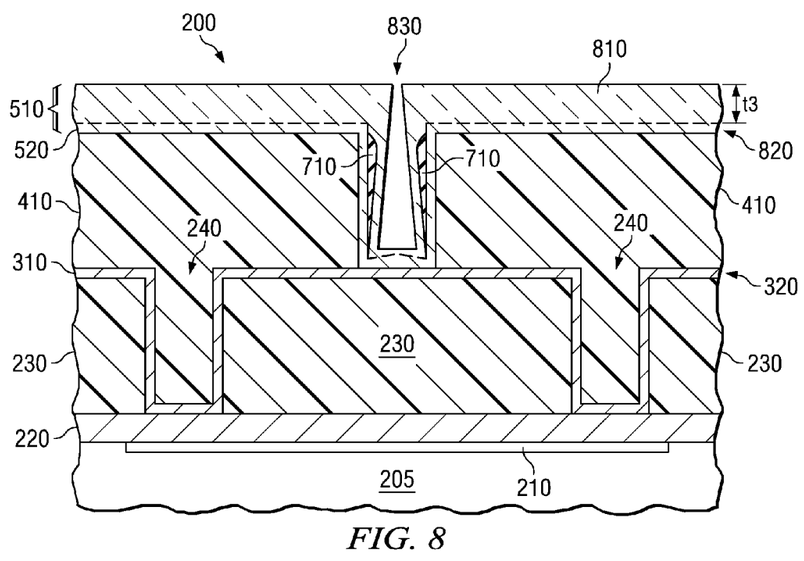

FIG. 8 illustrates the microelectronic device 200 of FIG. 7 after forming a second mirror layer 810 over the first mirror layer 520 and within the one or more openings 420 in the second spacer layer 410. As is illustrated, the dielectric portions 710 separate the first mirror layer 520 and the second mirror layer 810 along the sidewalls of the one or more openings 420.

The second mirror layer 810 may comprise the same material as the first mirror layer 520, particularly aluminum or an alloy thereof in the embodiment shown. Nevertheless, the second mirror layer 810 may comprise other materials. In the embodiment shown, the second mirror layer 810 forms a remaining portion of the mirror layer 510.

The second mirror layer 810 illustrated in FIG. 8 may be formed using various different processes. For example, the second mirror layer 810 may be sputter deposited. However, as compared to the formation of the first mirror layer 520, the second mirror layer 810 may be sputter deposited using a short throw distance target (e.g., as compared to the longer throw distance target used to form the first mirror layer 520).

The short throw distance target is beneficial in that it is capable of better filling the one or more openings 420. Accordingly, in one embodiment the short throw distance is set to about 100 mm or less. The second mirror layer 810 might ultimately have a thickness ($t_3$) ranging from about 150 nm to about 300 nm, among others. In certain embodiments, the second mirror layer 810 should be formed using a formation temperature less than about 150° C. At this temperature the formation of the second mirror layer 810 does not substantially affect the integrity of the first or second spacer layers 230, 410. Other processes could be used to form the second mirror layer 810.

After forming the second mirror layer 810 as described above, both the first and second mirror layers 520, 810 may then be patterned into a mirror structure 820. The process for patterning the first and second mirror layers 520, 810 may vary. Nevertheless, in one embodiment a technique similar to that used to pattern the hinge structure 320 may be used. After patterning the mirror structure 820, the mirror structure 820 may be subjected to a clean step. The clean step subjected to the mirror structure 820 may be similar to the clean step subjected to the hinge structure 320.

As briefly described above, the inclusion of the dielectric portions 710 causes an opening 830 in the mirror structure 820 to be less than it would be were the dielectric portions 710 not used. For instance, the existence of the dielectric portions 710 may cause the opening 830 to range from about 100 nm to about 200 nm, which was not attainable using existing processes. This smaller opening 830, allows the microelectronic device 200 to attain better contrast ratios than attainable in conventional structures. As also discussed above, the inclusion of the dielectric portions 720 additionally helps with metal fatigue issues.

Subsequent to patterning and cleaning the mirror structure 820, the first and second spacer layers 230, 410 may be removed. The removal of the first and second spacer layers 230, 410 may be conventional. For example, a downstream plasma ashing or other similar process may be used to remove the first and second spacer layers 230, 410. Nevertheless, other known or hereafter discovered processes could also be used.

The microelectronic device 200 of FIG. 8 may be but one of an array of such structures that could be located over the substrate 205. For instance, many thousands of such microelectronic devices 200 are often formed over a single substrate 205. Accordingly, the invention should not be limited to a single microelectronic device 200 located over a single substrate 205.

Figure 9:
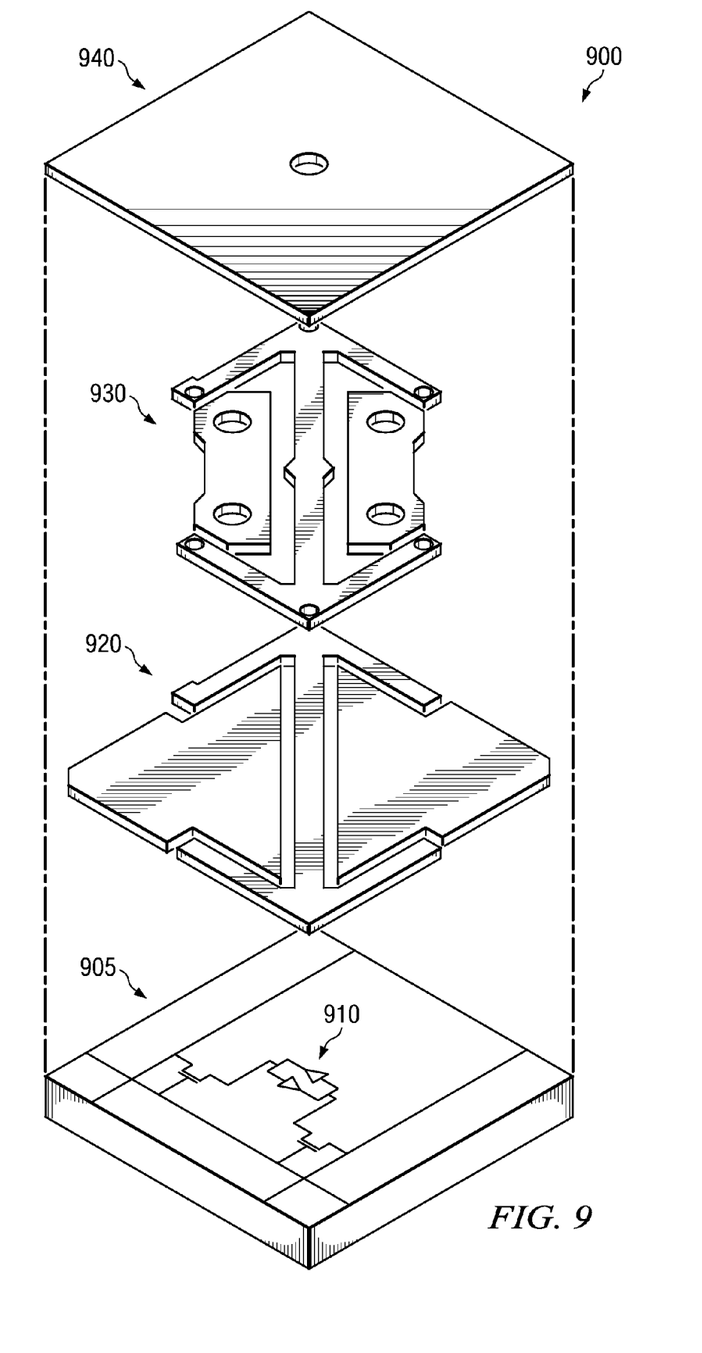
FIG. 9 illustrates an exploded view of a digital micromirror device manufactured in accordance with the invention.

FIG. 9 illustrates an exploded view of a DMD 900 manufactured in accordance with the invention. The DMD 900, among other elements, includes a substrate 905 having control circuitry 910 located therein or thereon and a patterned conductive feature 920 located over the control circuitry 910. The DMD 900 may further include a patterned hinge structure 930 located over the patterned conductive feature 920 and a patterned mirror structure 940 located over the patterned hinge structure 930. The substrate 905, control circuitry 910, patterned conductive feature 920, patterned hinge structure 930, and patterned mirror structure 940 may be the same or slight variations of the embodiment discussed above in FIG. 8.

Figure 10:
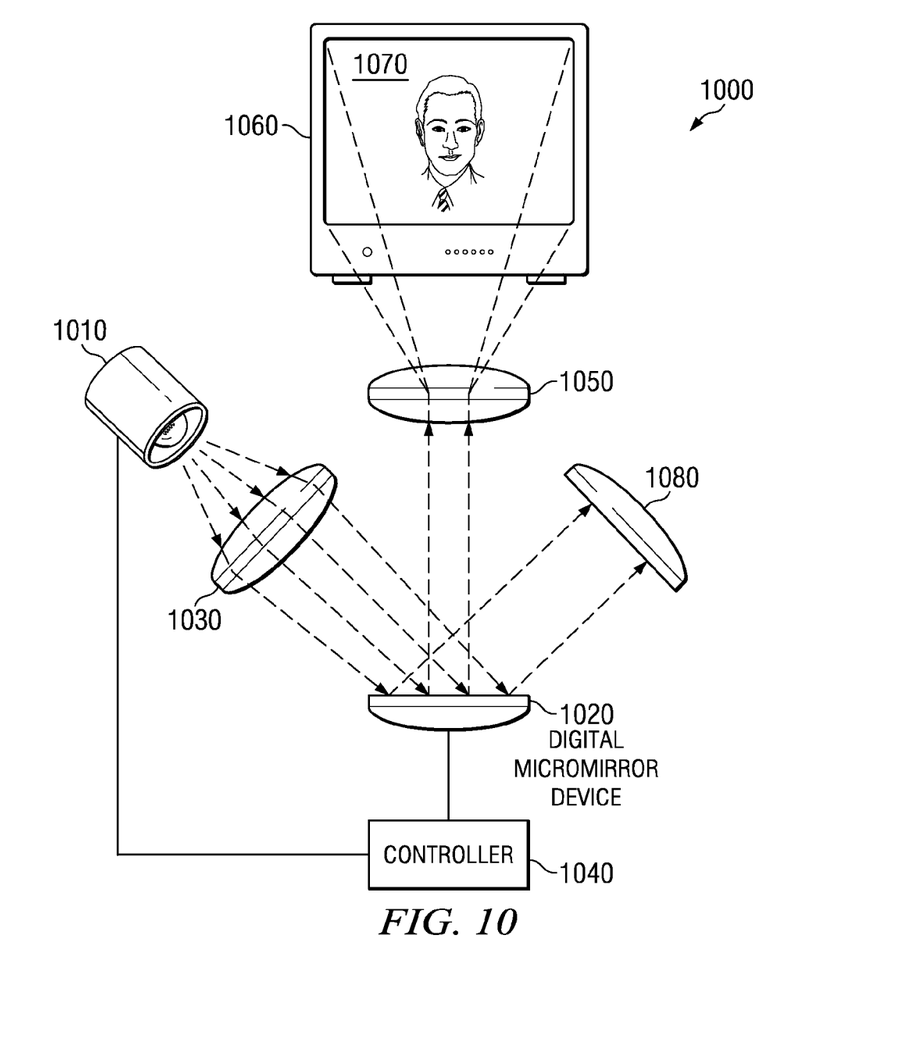
FIG. 10 illustrates a schematic of a projection display system manufactured in accordance with the invention.

FIG. 10 illustrates a block diagram of a projection display system 1000 incorporating DMD's manufactured in accordance with the invention. In the projection display system illustrated in FIG. 10, illumination from a light source 1010 is focused onto the surface of one or more DMD's 1020 by means of a condenser lens 1030 placed in the path of the light.

An electronic controller 1040 is connected to both the DMD's 1020 and the light source 1010 and used to modulate the DMD's 1020 and to control the light source 1010.

For all DMD pixels in the ON state, the incoming light beam is reflected into the focal plane of a projection lens 1050, where it is magnified and projected on to a viewing screen 1060 to form an image 1070. On the other hand, DMD pixels in the OFF state, as well as any stray light reflected from various near flat surfaces on and around the DMD's, are reflected into a light trap 1080 and discarded.

Those skilled in the art to which the invention relates will appreciate that other and further additions, deletions, substitutions and modifications may be made to the described embodiments without departing from the scope of the invention.

What is claimed is:

1. A method for manufacturing a mirror structure for use in a microelectronic device, comprising:
    forming a first mirror layer over and within one or more openings in a sacrificial spacer layer;
    forming a dielectric layer over an upper surface of the first mirror layer and within the one or more openings;
    subjecting the dielectric layer to an etch, the etch removing the dielectric layer from the upper surface and leaving dielectric portions along sidewalls of the one or more openings;
    forming a second mirror layer over the first mirror layer and within the one or more openings, the dielectric portions separating the first mirror layer and the second mirror layer along the sidewalls.

2. The method as recited in claim 1 wherein the sacrificial spacer layer comprises photoresist.

3. The method as recited in claim 1 wherein the dielectric layer comprises an oxide.

4. The method as recited in claim 1 wherein the first mirror layer and the second mirror layer comprise aluminum or an alloy thereof.

5. The method as recited in claim 1 wherein subjecting the dielectric layer to an etch includes subjecting the dielectric layer to an anisotropic etch.

6. The method as recited in claim 1 further including patterning the first and second mirror layers to form a mirror structure, and thereafter removing the sacrificial spacer layer.

7. The method as recited in claim 1 wherein forming the first and second mirror layers includes forming the first and second mirror layers using a temperature of less than about 150° C.

8. A method for manufacturing a microelectronic device, comprising:
    forming a first photoresist spacer layer over a substrate, the first photoresist spacer layer having one or more openings therein;
    forming a hinge structure over the first photoresist spacer layer and within the one or more openings;
    forming a second photoresist spacer layer over the hinge structure, the second photoresist spacer layer having one or more openings therein;
    forming a first mirror layer over the second photoresist spacer layer and within the one or more openings in the second photoresist spacer layer;
    forming a dielectric layer over an upper surface of the first mirror layer and within the one or more openings in the second photoresist spacer layer;
    subjecting the dielectric layer to an etch, the etch removing the dielectric layer from the upper surface of the first mirror layer and leaving dielectric portions along sidewalls of the one or more openings in the second photoresist spacer layer;
    forming a second mirror layer over the first mirror layer and within the one or more openings in the second photoresist spacer layer, the dielectric portions separating the first mirror layer and the second mirror layer along the sidewalls; and
    removing the first and second photoresist spacer layers after forming the second mirror layer.

9. The method as recited in claim 8 further including patterning the first mirror layer and second mirror layer prior to removing the first and second photoresist spacer layers, thereby forming a mirror structure including the first mirror layer, dielectric portions and second mirror layer.

10. The method as recited in claim 8 wherein the dielectric layer comprises an oxide.

11. The method as recited in claim 8 wherein the first mirror layer and the second mirror layer comprise aluminum or an alloy thereof.

12. The method as recited in claim 8 wherein subjecting the dielectric layer to an etch includes subjecting the dielectric layer to an anisotropic etch.

13. The method as recited in claim 8 wherein forming the first and second mirror layers includes forming the first and second mirror layers using a temperature of less than about 150° C.

14. The method as recited in claim 8 further including forming control circuitry over or in the substrate, the control circuitry in electrical connection with the conductive feature, wherein the control circuitry, control feature, hinge structure and mirror structure form at least a portion of a digital micromirror device.

15. A microelectronic device, comprising:
    a conductive feature;
    a hinge structure located over and contacting the conductive feature, wherein at least a portion of the hinge structure defines a first well; and
    a mirror structure located over the hinge structure, the mirror structure including:
        a first mirror layer contacting the hinge structure, wherein at least a portion of the first mirror layer defines a second well;
        dielectric portions located along sidewalls of the second well; and
        a second mirror layer located over the first mirror layer and within the second well, the dielectric portions located between the first mirror layer and the second mirror layer along the sidewalls.

16. The microelectronic device as recited in claim 15 wherein the dielectric portions comprise an oxide.

17. The microelectronic device as recited in claim 15 wherein the dielectric portions comprise silicon dioxide.

18. The microelectronic device as recited in claim 15 wherein the first mirror layer and the second mirror layer comprise aluminum or an alloy thereof.

19. The microelectronic device as recited in claim 15 further including control circuitry in electrical connection with the conductive feature, wherein the control circuitry, control feature, hinge structure and mirror structure form at least a portion of a digital micromirror device.

* * * * *